(12) United States Patent
Chainani et al.

(10) Patent No.: US 9,892,162 B2
(45) Date of Patent: *Feb. 13, 2018

(54) MANAGING COMPLEX QUERIES WITH PREDICATES

(71) Applicant: International Business Machines Corporation, Armonk, NY (US)

(72) Inventors: Naresh K. Chainani, Portland, OR (US); Kiran K. Chinta, Hillsboro, OR (US); Liping Zhang, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,126

(22) Filed: Oct. 12, 2016

(65) Prior Publication Data

US 2017/0147642 A1 May 25, 2017

Related U.S. Application Data

(63) Continuation of application No. 14/951,773, filed on Nov. 25, 2015.

(51) Int. Cl.
*G06F 17/30* (2006.01)

(52) U.S. Cl.
CPC .. *G06F 17/30463* (2013.01); *G06F 17/30424* (2013.01); *G06F 17/30474* (2013.01); *G06F 17/30477* (2013.01)

(58) Field of Classification Search
CPC .. H04N 21/433; H04N 21/00; H04N 21/2183; H04N 21/231; H04W 48/14; B01D 33/00; G06F 17/30595; G06F 17/30864; G06F 17/3048; G06F 17/30442; G06F 17/301; G06F 17/30457; G06F 17/30761; G06F 17/30144; G06F 17/30321; G06F 17/30029; G06F 17/30454; G06F 17/30463; G06F 17/30286
USPC ........ 707/999.005, 610, 640, 812, 723, 758, 707/754, 750, 718, 714, 741
See application file for complete search history.

(56) References Cited

U.S. PATENT DOCUMENTS

| 9,213,741 | B2* | 12/2015 | Burger | G06F 17/30463 |
| 9,563,663 | B2 | 2/2017 | Shukla et al. | |
| 2004/0010488 | A1* | 1/2004 | Chaudhuri | G06F 17/30463 |
| 2005/0120000 | A1* | 6/2005 | Ziauddin | G06F 17/30306 |
| 2006/0294311 | A1* | 12/2006 | Fu | G06F 17/30864 711/118 |

(Continued)

OTHER PUBLICATIONS

Obando, et al. "Performance Considerations for Entity Framework 4, 5, and 6", Microsoft, https://msdn.microsoft.com/en-us/data/hh949853.aspx.*

(Continued)

*Primary Examiner* — Hosain Alam
*Assistant Examiner* — Robert F May
(74) *Attorney, Agent, or Firm* — Jared L. Montanaro (57) ABSTRACT

A first query is detected. The first query is for a storage device, and pulls a result set from the storage device using a set of predicates. The first query satisfies a size criterion. A new set of predicates of the result set is identified. The new set of predicates does not include any predicates of the original set of predicates. A second query which is the same as the first query is detected. The new set of predicates is used to determine the result set.

1 Claim, 3 Drawing Sheets

(56) References Cited

U.S. PATENT DOCUMENTS

| | | | | |
|---|---|---|---|---|
| 2008/0168058 | A1* | 7/2008 | Gordon | G06F 17/30306 |
| 2009/0100004 | A1* | 4/2009 | Andrei | G06F 17/30424 |
| 2012/0317094 | A1* | 12/2012 | Bear | G06F 17/30463 |
| | | | | 707/714 |
| 2013/0282964 | A1 | 10/2013 | Sengupta et al. | |
| 2014/0089318 | A1 | 3/2014 | Liu et al. | |
| 2014/0143505 | A1 | 5/2014 | Sim et al. | |
| 2014/0164281 | A1 | 6/2014 | Balkir et al. | |
| 2015/0169655 | A1* | 6/2015 | Gupta | G06F 17/30563 |
| | | | | 707/602 |
| 2016/0092584 | A1 | 3/2016 | Nigam | |
| 2017/0091315 | A1* | 3/2017 | Finlay | G06F 17/30501 |

OTHER PUBLICATIONS

Davidson, et al. "DMVs for Query Plan Metadata", Red Gate Software Ltd, https://www.simple-talk.com/sql/t-sql-programming/dmvs-for-query-plan-metadata/.*

Obando, et al. "Performance Considerations for Entity Framework 4, 5, and 6", Microsoft, <https://msdn.microsoft.com/en-us/data/hh949853.aspx>.*

Davidson, et al. "DMVs for Query Plan Metadata", Red Gate Software Ltd, <https://www.simple-talk.com/sql/t-sql-programming/dmvs-for-query-plan-metadata/>.*

Davidson, et al., "DMVs for Query Plan Metadata", Aug. 17, 2010. Last printed Oct. 26, 2015, 10:32 AM. 22 pages. https://www.simple-talk.com/sql/t-sql-programming/dmvs-for-query-plan-metadata/.

Obando, et al, "Performance Considerations for Entity Framework 4, 5, and 6", Published Apr. 2012. Last updated May 2014. Last printed Oct. 26, 2015, 10:31 AM. 26 pages. https://msdn.microsoft.com/en-us/data/hh949853.aspx.

Chainani et al., "Managing Complex Queries With Predicates," U.S. Appl. No. 14/951,773, filed Nov. 25, 2015.

List of IBM Patents or Patent Applications Treated as Related, Oct. 11, 2016, 2 pgs.

* cited by examiner

FIG. 3B

MANAGING COMPLEX QUERIES WITH PREDICATES

BACKGROUND

The present disclosure relates to computer systems, and more specifically, to processing large queries. Large and complex queries are becoming increasingly common. These queries may occur either on premise or through a cloud computing network. The complex queries may process upwards of gigabytes of data. The result set from complex queries may include hundreds of millions of tuples and may take days or weeks to process.

SUMMARY

Aspects of the disclosure include a system, a method, and a computer program product for processing complex queries. A first query may be detected. The first query may be for a storage device, and may pull a result set from the storage device using a set of predicates. The first query may satisfy a size criterion. A new set of predicates of the result set may be identified. The new set of predicates may not include any predicates of the original set of predicates. A second query which is the same as the first query may be detected. The new set of predicates may be used to determine the result set. The new set of predicates may be monitored to verify continued accuracy. In response to potential inaccuracy of a new predicate, the new predicate may be deleted or modified.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include a system and method for processing complex queries. A first complex query may be detected. The first complex query may be processed using a set of initial predicates and may result in a result set. New predicates for the first complex query may be identified from the result set. A second complex query which is substantially similar to the first complex query may be detected. The new predicates may be used to process the second complex query. While the present disclosure is not necessarily limited to such applications, various aspects of the disclosure may be appreciated through a discussion of various examples using this context. Examples and example values discussed herein are provided by way of example only and are not to be construed as limiting.

Complex queries often result in relatively massive data sets which include hundreds of millions or more tuples. These queries may be culled from relatively massive databases. In order to determine a final result set for a complex query, a query controller may first pull a subset of the massive database which contains all data which may be relevant to the query. From this initial subset, the controller may filter out data that does not match the parameters (e.g., predicates) of the query. This first draw from a database for a complex query may include a billion or more tuples. Substantially identical queries may be asked numerous times. Conventional storage systems may analyze and optimize the set of predicates of a first complex query in the form of query plan. The query plan may be stored within a cache and referenced when a second substantially identical complex query is detected in an attempt to expedite the query process. However, even with a stored query plan, a conventional storage system may need a plurality of days or even weeks to process a complex query. Alternatively, conventional storage systems may store the entire result set of a complex query. However, storing one or more result sets, each of which often include hundreds of millions of tuples, may require a relatively high amount of storage.

Aspects of the present disclosure relate to identifying metadata of result sets to determine new predicates which may expedite the process of executing complex queries. A query controller may detect a first complex query. A query may be identified as complex where the result set includes a threshold number of tuples. The query controller may identify a set of initial predicates which were used to filter the first complex query. The query controller may then analyze the result set for new predicates. The new predicates may be used on a second complex query which is substantially similar to the first complex query. The query controller may check the continued accuracy of the new set of predicates, which may include removing predicates when underlying data has changed. For example, where new tuples are added to the storage system, the query controller may delete new predicates which fail to account for the new tuples.

Figure 1:
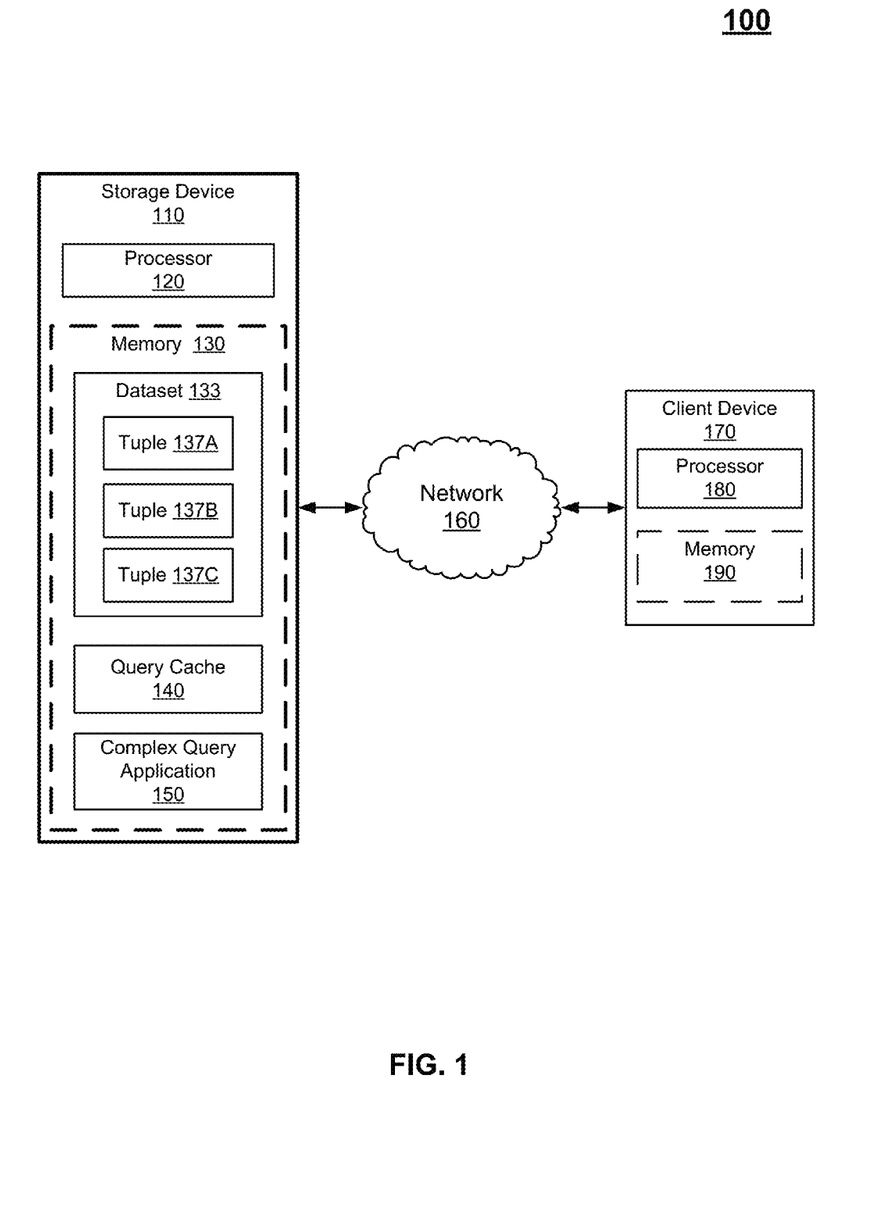
FIG. 1 depicts a block diagram of an example computing environment with a client and a storage system, according to embodiments.

Referring now to FIG. 1, a block diagram of an example computing environment 100 for processing complex queries is depicted, according to some embodiments of the present disclosure. In some embodiments, the computing environment 100 can include one or more storage devices 110 and one or more client devices 170. While FIG. 1 depicts an embodiment with one client device 170 and one storage device 110, other embodiments with more client devices 170 and more storage devices 110 are also possible. The storage device 110 and client device 170 can be geographically removed from each other and communicate over a network. In some embodiments, the storage device 110 and client device 170 communicate using a cloud computing network.

The storage device 110 may include a processor 120 and a memory 130. The memory may include a dataset 133 with a plurality of tuples 137A-C. While only three tuples 137A, 137B, 137C are depicted within FIG. 1 for the sake of clarity, in some embodiments a dataset 133 of a storage device 110 may include many more tuples (e.g., billions of tuples). The memory 130 may further store applications. The instructions of the applications may be executed by the processor 120. These instructions may cause the processor 120 to execute at least one part of the functionality described below with respect to method 200. Part of method 200 may be included in instructions from the complex query application 150. The complex query application 150 may process complex queries and store metadata of complex queries (e.g., predicates, query plans) in the query cache 140. While in FIG. 1 the complex query application 150 and query cache 140 are depicted as being stored on a storage device 110, in other embodiments one or both of the complex query application 150 and query cache 140 may be stored on the client device 170.

The client device 170 may include a memory 180 and a processor 190. The memory 180 may store applications whose instructions may be executed by the processor 190. These instructions may cause the processor 190 to execute at least one part of the functionality described below with respect to method 200. These applications may create an open-ended query which solicits all tuples of a dataset 133 which satisfy a set of initial predicates. In response to these applications, the client device 170 may send the query to the storage device 110 which stores the dataset 133.

The complex query application 150 may detect the query. The complex query application may use the query cache 140 to select a query plan. The query may be processed, therein filtering an initial set of tuples (e.g., billions of tuples) to a result set which includes tuples 137A-C in this example. The complex query application 150 may then analyze the final result set to determine new predicates. The new predicates may be stored in the query cache 140 along with a query plan or other such metadata for the complex query. If the complex query application 150 detects a new query from the same client device 170 or a different client device, the complex query application 150 may compare the new query to the first complex query. If the new query and the first complex query are substantially similar, the complex query application 150 may use the new predicates to filter the new query. Using predicates determined from the result set may result in the complex query application 150 filtering to the final result set relatively faster than if the complex query application 150 did not use the new predicates.

The complex query application 150 may perform maintenance on the new predicates. For example, suppose that tuple 137A is deleted. In this instance, the new predicate may have a false positive, such that the new predicate may "pass" a tuple which is no longer applicable. The complex query application 150 may determine that a single false positive from tuple 137A is acceptable. However, once a threshold of false positives is reached (e.g., once a few thousand tuples have been deleted while still being passed by the new set of predicates), the complex query application 150 may remove/invalidate some of the new predicates which relate to the deleted tuples.

For another example, suppose that a new tuple is added to memory 130. While many false positives are acceptable, a single false negative (e.g., a result which does not include a tuple which matches the parameters of the query and therein should be included in the result set) may not be acceptable. As such, when a tuple is added to an applicable data set, the complex query application 150 may immediately invalidate new predicates which relate to the new tuple.

Consistent with various embodiments, the client device 170 and storage device 110 may each be computer systems, and may each be equipped with a display or monitor. The computer systems may include at least internal or external network interface or communications devices (e.g., modem, network interface cards), optional input devices (e.g., a keyboard, mouse, touchscreen, or other input device), and commercially available or custom software (e.g., browser software, communications software, server software, natural language processing software, search engine and/or web crawling software, filter modules for filtering content based upon predefined criteria). The computer systems may include servers, desktops, laptops, and hand-held devices.

Figure 2:
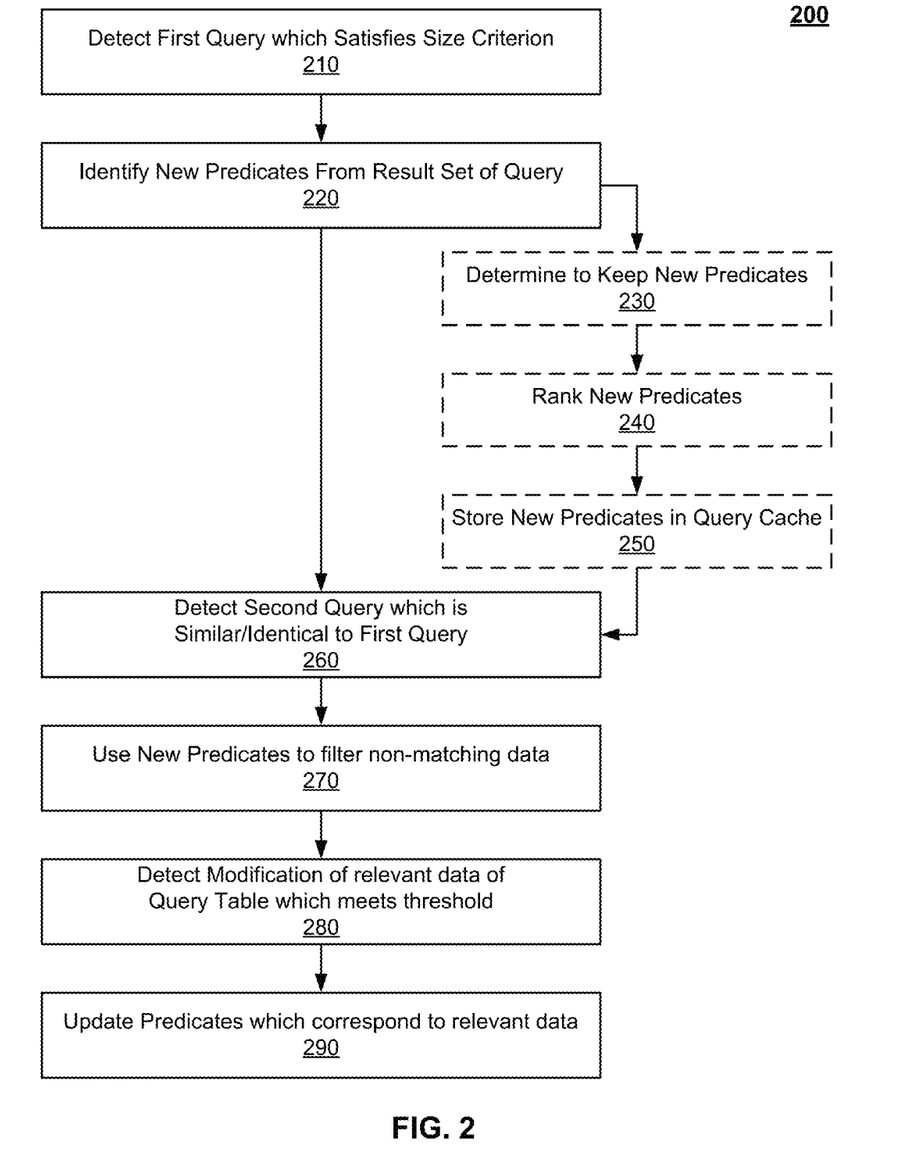
FIG. 2 depicts a method of improving data retrieval for complex queries, according to embodiments.

FIG. 2 is a flowchart illustrating a method 200 of processing complex queries. Method 200 includes one or more storage devices, which may be similar to the storage device 110 of FIG. 1. The storage device may receive queries from one or more client devices, which may be equivalent to the client device 170 of FIG. 1. The storage device may retrieve data of the query, allowing some combination of the storage device and client device to process the data into a result set for the query. The host and storage device communicate over a network, such as a cloud computing network. Blocks with hashed lines in FIG. 2 may be optional steps within method 200. The visual arrangement of blocks in the flowchart of FIG. 2 is not to be construed as limiting the order in which the individual acts/operations may be performed, as certain embodiments may perform the operations of FIG. 2 in alternative orders.

At block 210 a first complex query is detected. The first complex query includes a set of initial predicates. The first complex query is directed towards a specific dataset, such as, for example, the data of a storage device or a storage network. A query controller may detect the first complex query. The set of initial predicates may be the elements which define the query. Put differently, a complex query may be a request for tuples that satisfy a set of initial conditions/predicates. In this way, a complex query may be an open-ended query (e.g., a request for any tuples which satisfies predicates A, B, and C) rather than a close-ended query (e.g., a request for a specific known tuple or for a specific set of known tuples).

For example, the first complex query may be for all online sales of ABC Inc. during the first quarter which are over $200.00. The first complex query includes initial predicates of "online," "ABC Inc." "first quarter," and "greater than $200." The query controller may first gather any tuple from the dataset which might satisfy all of the predicates using techniques known in the art before filtering to the tuples which do satisfy all four of the predicates. The first complex query may relate to all tuples which satisfy all four predicates, regardless of how many tuples this is. The tuples which satisfy all four of the initial set of predicates comprise the result set for the first complex query.

A query may be a complex query when said query satisfies a size criterion. The size criterion may be related to the number of tuples of the result set. For example, a size criterion can be a result set of 50 million tuples, wherein if a result set includes 50 million or more tuples, the size criterion is satisfied and the query is a complex query. If a query nets a result set of 54 million tuples, the result set and therein the query may satisfy the size criterion of 50 million tuples. As a result, the query controller may determine the query to be a complex query.

The size criterion may alternatively be related to the number of tuples which are gathered in the initial response to the query, said tuples hereinafter referred to as the initial set of tuples. For example, a size criterion can be one 750 million tuples, such that an initial set of 750 million or more tuples satisfied the size criterion. A query may include initial predicates. The query controller may use techniques known to one of skill in the art to gather an initial set of tuples that includes all tuples that may satisfy the initial predicates. The query controller may gather 1 billion tuples for the initial set of tuples. The query controller may detect that 1 billion tuples satisfies the size criterion (e.g., that 1 billion is more than 750 million) and may therein determine that the query is a complex query.

The size criterion may alternatively be related to the amount of time in which it takes to process a query. In some embodiments, a query may not result in a relatively small number of tuples (e.g., 100 tuples), even where the query takes a relatively long amount of time to complete (e.g., a week) due to the complexity of the query. In such embodiments, query controller may detect that the time taken to process the query is long enough to satisfy a time threshold of the size criterion.

The query controller may process the first complex query using techniques known to one skilled in the art. The first complex query may result in a result set. The query controller may return the result set to the client which requested the query. In some embodiments, this may entail the query controller processing the result set on a storage server and sending the result set over a network to the client device.

At block 220 one or more new predicates are determined. The new predicates are selected from the result set of the first complex query. The new predicates are not included within the initial set of predicates. Specifically, the new predicates may be predicates which are derived from columns of the result set which were unrepresented in the initial set of predicates. Each unrepresented column may result in a plurality of new predicates. The new predicates may be min/max filters or bloom filters. Min/max filters and bloom filters are known to one of skill in the art. Other types of predicates are also possible. The query controller may determine the new predicates.

For example, the first complex query from above relating to the first quarter of online sales over $200 by ABC Inc. may have returned data on the customer ID relating to the sales. In some embodiments, the query controller may gather the customer ID data in response to the first complex query specifying that the result set be organized/grouped by customer ID. The query controller may identify that customer ID was not included in the initial set of predicates and therein identify customer ID as on or more new predicates.

At block 230 the query controller may determine to keep the new predicates. The query controller may determine to keep the new predicates when the new predicates filter a threshold percentage of tuples. The query controller may determine to keep the new predicates by executing a minimum/maximum (min/max) filter on the new predicates. For example, the query controller may determine if a min/max filter is an effective way of filtering using customer ID values from the initial set to the result set. If the customer ID values are densely populated in a specific range of the dataset with no values at other ends of the range, the query controller may determine to keep the customer ID predicate and filter around the specific range. The query controller may have a threshold amount of 10% reduction (e.g., a min/max filter must filter 10% of initial set values to be kept as a new predicate). Specifically, for example, if the query controller determines that all customer IDs of the result set are included in a first third of the initial set of tuples, the query controller may determine to keep a new predicate which is the first third of customer IDs, which may then filter out the last two thirds of tuples of the initial set of tuples.

Alternatively, the query controller may determine to keep a new predicate by evaluating a bloom filter using a new predicate. A bloom filter as known by one skilled in the art may create a probabilistic dataset which includes all data which can be in a desired dataset (e.g., the result set). The query controller may perform a bloom filter using the new predicate on the initial set of tuples to determine how effective the new predicate is. For example, the query controller may identify that the initial set included 1 billion tuples and that the threshold percentage to keep a new predicate is 15%. The bloom filter of the predicate may reduce the initial set to 800 million tuples. The query controller may identify that the 20% reduction satisfies the threshold percentage, therein keeping the new predicate.

At block 240 the query controller may rank the new predicates. New predicates may be ranked according to an amount of the initial set of tuples which the new predicates can eliminate through filtering. For example, using the bloom filter and min/max filter above, the customer ID bloom filter eliminates 20% of the initial set, while the customer ID min/max filter eliminates 66% of the initial set. Being as the customer ID min/max filter successfully filters out a greater amount of the initial set, the query controller may rank customer ID min/max filter higher. The new predicates which are ranked higher may be used before new predicates which were ranked lower in a preceding complex query. In some embodiments, the new predicates may be ranked relative to the initial predicates.

At block 250 the query controller may store the new predicates at the query cache. The query cache may be the location at which other metadata related to processing the query (e.g., such as a query plan related to the query) is stored. The query controller may also store any rankings of the new predicates as determined at block 240.

At block 260 a second complex query is detected. The second complex query is directed to a specific dataset. The specific dataset may be the same dataset which the first complex query was directed towards. The specific dataset may be data of a storage device or a storage network, for example.

The second complex query is the same as the first complex query. As used herein, the term "same" can include some variation between the queries being compared. For example, in some embodiments, the second complex query is the same as the first complex query even if minor and/or semantic differences exist between the first complex query and the second complex query (e.g., a capitalization/comma/spacing distinction between the two queries). Such differences can be detected and accounted for by a query controller. In some embodiments, the second complex query may need to be identical to the first complex query.

In response to detecting a second complex query which is the same as the first complex query, the query controller may gather the new predicates from the query cache. The query controller may gather other metadata for processing the second query within the same acquisition, such as the query plan or query statistics as known by one skilled in the art.

At block 270 the new predicates are used to process the second complex query. The new predicates may be used to filter the initial set. The new predicates may be used before the initial predicates to filter the initial set.

Figure 3A:
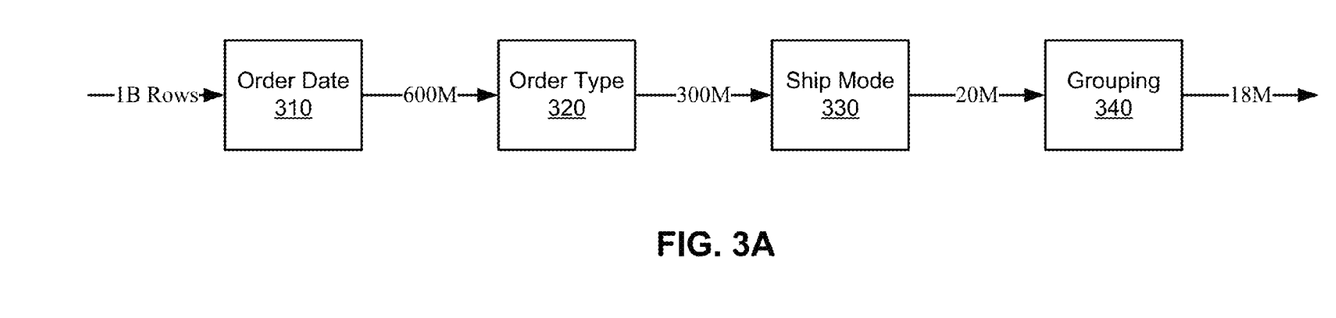
FIG. 3A and FIG. 3B depict flowcharts of filtering complex queries, according to embodiments.

For example, FIG. 3A depicts a flow of filtering a first complex query relating to business sales. The first complex query includes initial predicates of order date 310 (e.g., sales during a first quarter), order type 320 (e.g., online sales), and ship mode 330 (e.g., overnight shipping), following by a grouping 340 (e.g., by customer ID, sale ID, and store ID) operation. The first complex query may be filtered using a query plan determined by techniques known to those skilled in the art. The first complex query may return an initial set of one billion rows of data (e.g., where each row represents a sale), which after order date 310 is reduced to 600 million rows, which after order type 320 is reduced to 300 million rows, which after ship mode is reduced to 20 million rows. After the set is reduced to 20 million rows, the query controller may organize the result by using a grouping combination of customer ID, store ID, and sale ID, returning a single row for each unique combination of this grouping combination. Typically, the set is reduced due to as some redundant rows. In this case, grouping reduces the set to 18 million rows to achieve a final result set. In some embodiments, the act of grouping may not reduce the amount of rows in the set. For example, in some embodiments, if all 20 million rows in the set going into grouping 340 had distinct values, the final result set would instead be the grouped 20 million rows.

Figure 3B:
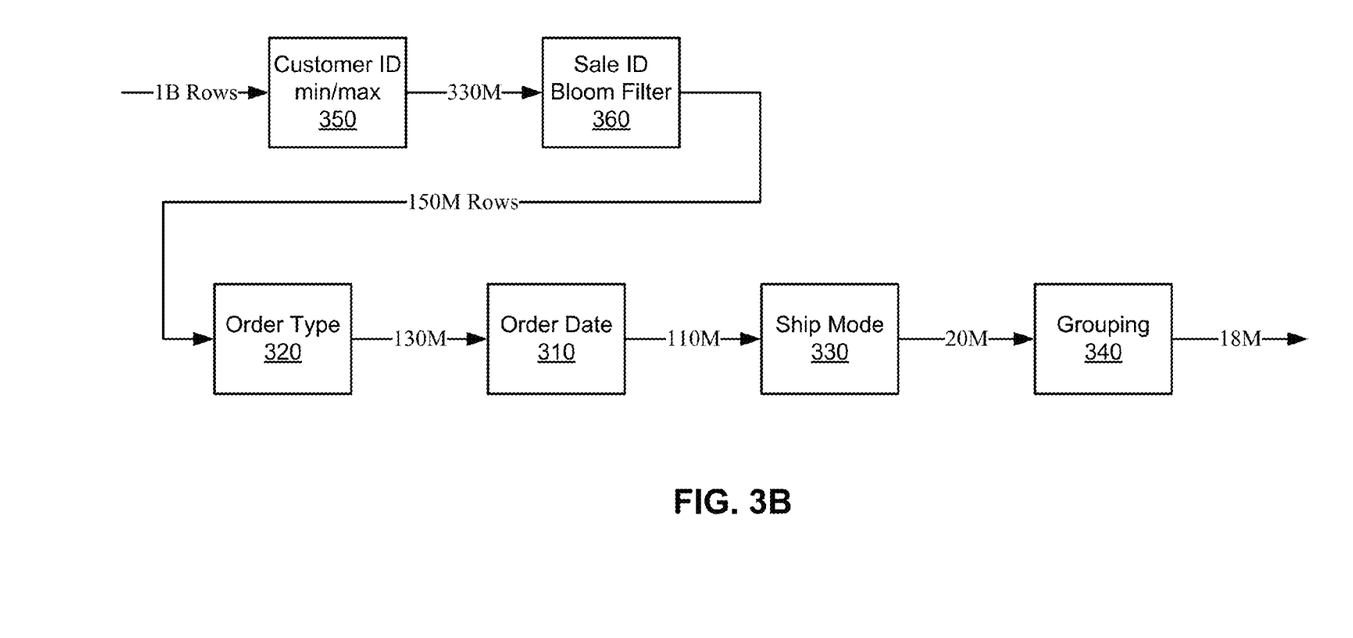

The query controller may analyze the 18 million rows of the result set and determine new predicates as described herein. The new predicates may be customer ID using a min/max filter and a sale ID using a bloom filter. In this example, the query controller may not include predicates relating to store ID in response to detecting that store ID predicates are relatively ineffective at filtering the initial set of tuples. The query controller may detect a second complex query which corresponds to the first complex query. FIG. 3B depicts a flow of the query controller processing the second complex query using the new predicates. The customer ID min/max filter 350 filters the initial set of one billion rows to 330 rows. The sales ID bloom filter 360 filters the 330 rows to 150 rows. The customer ID min/max filter 350 may be utilized before the customer ID bloom filter 360 in response to the min/max filter being ranked by the query controller higher than the bloom filter. In some embodiments, the remaining filters 310, 320, 330, 340 may be in the same order as in FIG. 3A. However, in other embodiments, the remaining filters may be reranked to maximize the filtering process. For example, if a substantial amount of the rows which the order date 310 filtered were instead filtered out by the sale ID bloom filter 360, order date 310 may be switched with order type 320 as depicted in FIG. 3B.

In some embodiments, FIG. 3A and FIG. 3B may be completed between two sub-queries of a large query. For example, if a large query has a plurality of sub-queries, and two or more of the sub-queries are the same complex queries as described herein, the query controller may detect a first complex sub-query of a large query upon filtering the sub-query (e.g., as depicted in FIG. 3A), determine new predicates of the complex sub-query (e.g., as determined by the query controller after FIG. 3A), detect a second substantially similar complex sub-query of the same large query, and use the new predicates for the second complex sub-query as shown in FIG. 3B. It is to be understood that the values discussed above with respect to FIGS. 3A and 3B are provided by way of example only for purposes of explanation and are not to be construed as limiting.

At block 280 of FIG. 2 the query controller detects a modification of the dataset of the first complex query. The modification is sufficient to satisfy an update threshold for one or more new predicates. The modification may be a deletion, alteration, or insert of a number of rows, or the modification may be related to data deletion language (DDL) of the dataset. Deletion/alteration of rows may result in false positives by the new predicates (e.g., new predicates including rows which are no longer applicable to a complex query). The update threshold may include a threshold number of deleted rows. For example, the deletion of 2000 or more rows may be enough to trigger a predicate update. For another example, the deletion of at least 1% of rows may be required to trigger a predicate update. In other embodiments, the update threshold may be the addition of a single new row/tuple, the update to a single table, or a single DDL instance. A single new data entry, updated data instance, or DDL instance may mean the possibility of a false negative (e.g., new predicates excluding rows which are applicable to the complex query).

In some embodiments, the modification relates to data of the result set. In other embodiments, the modification relates to any data of the initial set of tuples, regardless of whether the data is also data of the result set. In yet other embodiments, the modification may be to any data of the dataset to be detected by the query controller.

At block 290 a new predicate is updated in response to the data modification of block 280. The new predicate may be updated by being deleted. A new predicate may be deleted from the query cache such that the query controller no longer may use the new predicate. In other embodiments, a new predicate may be updated by being recalculated. The predicate may be recalculated with a new min/max filter evaluation or a new bloom filter evaluation.

In some embodiments, a new predicate may be temporarily disabled. The new predicate may be temporarily disabled at runtime during a final evaluation of the new predicate by the query controller. During the final evaluation, the query controller may disable the new predicate if the query controller determines that the new predicate may be ineffective. For example, the query controller may determine that a new predicate which utilizes a bloom filter has more than a threshold number of collisions as known by one skilled in the art, inhibiting the ability of the new predicate to successfully filter the initial set of tuples. It is also possible for the query controller to determine other reasons why a new predicate is ineffective. Following the conclusion of the runtime for the complex query, the query controller may test the predicate to determine whether or not the new predicate is filtering a threshold amount as per block 230. If the new predicate fails to filter the threshold amount of tuples of the initial set of tuples, the query controller may remove the new predicate from the query cache. If the new predicate successfully filters the threshold amount of tuples, the new predicate may be used in a new complex query which is the same as the first complex query.

The functionality outlined in the discussions herein regarding FIG. 1, FIG. 2, FIG. 3A, and FIG. 3B above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in the computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of processing complex queries, comprising:
   detecting a first query from a first client device directed towards a dataset, wherein the first query includes an initial set of predicates and results in a first result set, wherein an initial set of tuples are initially gathered from the dataset in response to the first query, wherein each tuple of the initial set of tuples satisfies at least one of the predicates of the initial set of predicates, wherein the initial set of tuples is reduced to the first result set as predicates of the initial set of predicates eliminate tuples;

storing a query plan and query statistics of the first query in the database;

determining that the initial set of tuples includes an amount of tuples that satisfies a size criterion;

in response to determining that the amount of tuples satisfies the size criterion, identifying a set of columns from the first result set that do not correspond to a predicate of the initial set of predicates;

executing both a set of min/max filters and a set of bloom filters on the first result set, wherein each bloom filter of the set of bloom filters is derived from a respective column of the set of columns and each min/max filter of the set of min/max filters is derived from a respective column of the set of columns;

determining that a subset of the set of bloom filters would filter a threshold percentage of tuples from the initial set of tuples;

determining that a subset of the min/max filters would filter the threshold percentage of tuples from the initial set of tuples;

identifying both the subset of the set of bloom filters and the subset of the min/max filters as new predicates;

detecting a second query from a second client device directed towards the dataset, wherein the second query is the same as the first query;

evaluating the new predicates immediately before executing the second query;

detecting an indicia of ineffectiveness regarding the new predicates while evaluating the new predicates;

in response to detecting the indicia of ineffectiveness, disabling the new predicates at runtime for the second query, wherein disabling the new predicates results in the new predicates not being used in the second query;

testing the new predicates following the conclusion of the runtime for the second query;

verifying that each of the new predicates filter the threshold amount of tuples from the initial set of tuples;

detecting a third query from a third client device directed towards the dataset, wherein the third query is the same as both the first query and the second query; and utilizing the new predicates, the query plan, and the query statistics to process the third query and determine a third result set for the third query, wherein the new predicates are used in response to verifying that each of the new predicates filter the threshold amount of tuples from the initial set of tuples.

* * * * *